United States Patent [19]

Smyrk et al.

[11] Patent Number: 5,456,548
[45] Date of Patent: Oct. 10, 1995

[54] CONTROL APPARATUS FOR LINE MARKING MACHINES

[75] Inventors: John Smyrk, Dee Why N.S.W.; Alan Loughron, Murrumbeena; Dennis Siroky, Hampton, all of Australia

[73] Assignee: Roads Corporation, Victoria, Australia

[21] Appl. No.: 290,794

[22] PCT Filed: Mar. 4, 1993

[86] PCT No.: PCT/AU93/00091

§ 371 Date: Sep. 19, 1994

§ 102(e) Date: Sep. 19, 1994

[87] PCT Pub. No.: WO93/18236

PCT Pub. Date: Sep. 16, 1993

[30] Foreign Application Priority Data

Mar. 6, 1992 [AU] Australia .................. PL1237

[51] Int. Cl.⁶ .................................. E01C 23/00
[52] U.S. Cl. .................................. 404/84.05
[58] Field of Search .................. 404/84.05, 94, 404/93

[56] References Cited

U.S. PATENT DOCUMENTS

| 3,298,352 | 1/1967 | Vrablik . |
| 5,054,959 | 10/1991 | Wilson et al. . |
| 5,169,262 | 12/1992 | Wilson et al. .................. 404/84.05 |
| 5,203,923 | 4/1993 | Hartman .................. 404/94 X |

FOREIGN PATENT DOCUMENTS

| 22538 | 6/1979 | Australia . |
| 1658432 | 11/1971 | Germany . |
| 3108975 | 9/1982 | Germany . |

*Primary Examiner*—Michael Powell Buiz
*Attorney, Agent, or Firm*—Bell Seltzer Park & Gibson

[57] ABSTRACT

A control system is provided to enable pavement line marking apparatus to refurbish old lines on a pavement surface. The control system has at least one old line detector adapted to scan a predetermined width of the pavement surface while being carried forwardly along the pavement. The old line detector is capable of recognizing old line pattern transition points as taught by a neural network and in response to such recognition, control activation of new line material applicators to repeat accurately said line pattern changes.

7 Claims, 3 Drawing Sheets

CONTROL APPARATUS FOR LINE MARKING MACHINES

The present invention relates generally to apparatus for applying lines of desired configuration onto a roadway or pavement surface and more particularly to apparatus for controlling application of paint or other line marking materials to accurately repeat previously formed lines on the roadway or pavement surface.

Roadway or pavement marking lines (either centre lines or margin lines) inevitably wear out over time and the rehabilitation of these marking lines is a task that must be continually carded out by roadway maintenance organisations. The length of roadways in many countries including Australia result in a need for machinery that can accurately reform old line markings at relatively high speed so that costs can be minimised. There are in fact many difficulties involved in being able to accurately reform old making lines at high speed and some of these include difficulties with distinguishing the old line itself caused by extraneous road markings such as changes in road surface colouring, shadows, unusual colouring areas such as oil or paint splashes, and simply in some cases as a result of extreme wear of the old line. Moreover, changes in pattern configurations also cause difficulties for continuous high speed reforming of old lines.

In prior patent literature there have been disclosed many proposals for mechanising reforming of old pavement lines. Some of these are disclosed in U.S. Pat. Nos. 3,046,854, 3,101,175, 3,286,929 and 3,298,352, all of which would have various problems associated with being able to distinguish old line markings, to be able to accurately repeat those old line markings and more particularly, to handle changes in line patterns. In U.S. Pat. No. 5,054,959 there is disclosed apparatus for distinguishing old line markings on a roadway surface and in response thereto, correctly positioning paint applicator guns so that paint could be applied correctly over the old line markings. This apparatus has been used successfully but certain difficulties have arisen in relation to recognition of old line markings including pattern changes in those markings, particularly when operating at high speed.

The objective therefore of the present invention is to provide improvements in control apparatus for machinery of the type generally disclosed in U.S. Pat. No. 5,054,959 to improve recognition of old line markings and particularly changes in pattern formats in those line markings. Preferably it is an objective of the present invention to enable operational speeds to be improved by improved old line and line pattern recognition.

According to a first aspect of the present invention there is provided in control apparatus for controlling application of line marking to refurbish an old line pattern on a pavement surface, said control apparatus including at least one line detection means adapted in use to transverse scan a predetermined width of said pavement surface substantially greater than a width of said old line pattern while being carded forwardly in the direction of said old line pattern, said line detection means including pattern transition detector means taught through a neural network to recognise line pattern changes and in response thereto, control line marking material applicator means to repeat accurately said line pattern changes.

According to a further aspect of the present invention, there is provided control apparatus for controlling application of line marking material to refurbish an old line pattern on a pavement surface, said control apparatus comprising a first line detection means adapted to be mounted in use at a forward position whereby a first predetermined width of said pavement surface substantially greater than said old pattern width is transverse scanned with information indicative of said old line pattern viewed by said first line detection means being retained over a first predetermined length of said pavement surface in the direction of said old line pattern, a second line detection means adapted to be mounted in use rearwardly of said first line detection means, said second line detection means being in use arranged to transverse scan a second predetermined width of said pavement surface substantially greater than the width of said old line pattern with information indicative of said old line pattern viewed by said second line detection means being retained over a second predetermined length of said pavement surface in the direction of said old line pattern, said first line detection means further recognising transition points in said old line pattern, said first line detection means further recognising transition points in said old line pattern and providing a signal indicative of said transition points to said second line detection means, said second line detection means including transition detector means which receives the signal indicative of transition points from said first line detection means and information from the transverse scan of said second line detection means and in response thereto provides control signal means to control on/off conditions of said line marking material applicator means.

According to a still further aspect of the present invention, there is provided control apparatus for controlling application of line marking material to refurbish an old line pattern on a pavement surface, said control apparatus comprising a first line detection means adapted to be mounted in use at a forward position whereby a first predetermined width of said pavement surface substantially greater than said old pattern width is transverse scanned with information indicative of said old line pattern viewed by said first line detection means being retained over a first predetermined length of said pavement surface in the direction of said old line pattern, a second line detection means adapted to be mounted in use rearwardly of said first line detection means, said second line detection means in use being arranged to transverse scan a second predetermined width of said pavement surface substantially greater than the width of said old line pattern with information indicative of said old line pattern viewed by said second line detection means being retained over a second predetermined length of said pavement surface in the direction of said old line pattern, said first line detection means producing a lateral shift control signal indicative of lateral shift of said old line pattern as sensed with said lateral shift control signal being adapted to control lateral movement of line marking material applicator means to correctly deposit said line marking material over lines forming said old line pattern, said first line detection means further recognising transition points in said old line pattern and providing a signal indicative of said transition points to said second line detection means, said second line detection means including transition detector means which receives the signal indicative of transition points from said first line detection means and information from the transverse scan of said second line detection means and in response thereto provides control signal means to control on/off conditions of said line marking material applicator means.

Preferably the first predetermined length of scanned pavement surface is substantially greater than said second predetermined length. Conveniently said first predetermined length is about five meters in length. The first predetermined width and the second predetermined widths may be equal or they may be different however, they are preferably between about 400 mm and 1.2 meters, conveniently about 500 mm.

The present invention of course includes within its scope apparatus for applying line marking materials to old line patterns including control apparatus as aforesaid carded by a vehicle or the like with line marking material applicator means located rearwardly of the second line detection means. The applicator means may be constructed as described in U.S. Pat. No. 5,054,959 or any other suitable means could be used. The line marking material might be liquid paint including solvent based paints or water based paints, thermally or cold applied plastic strip in one part or two component mix, or any other suitable material for refurbishing old lines.

A preferred embodiment will hereinafter be described with reference to the accompanying schematic diagrams, in which.

Figure 1:
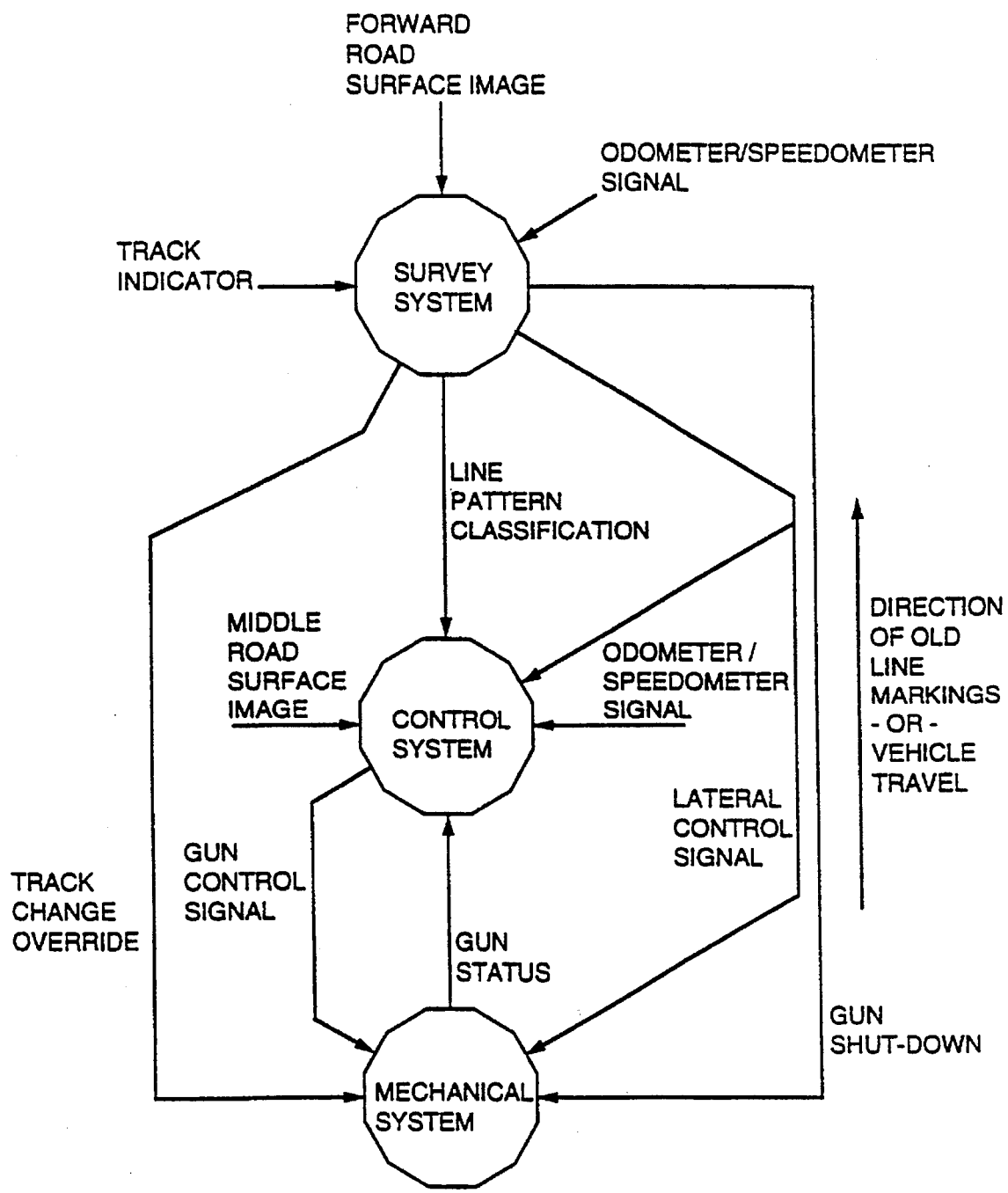
FIG. 1 represents an information flow diagram in a preferred form of control apparatus according to the present invention.
Figure 2:
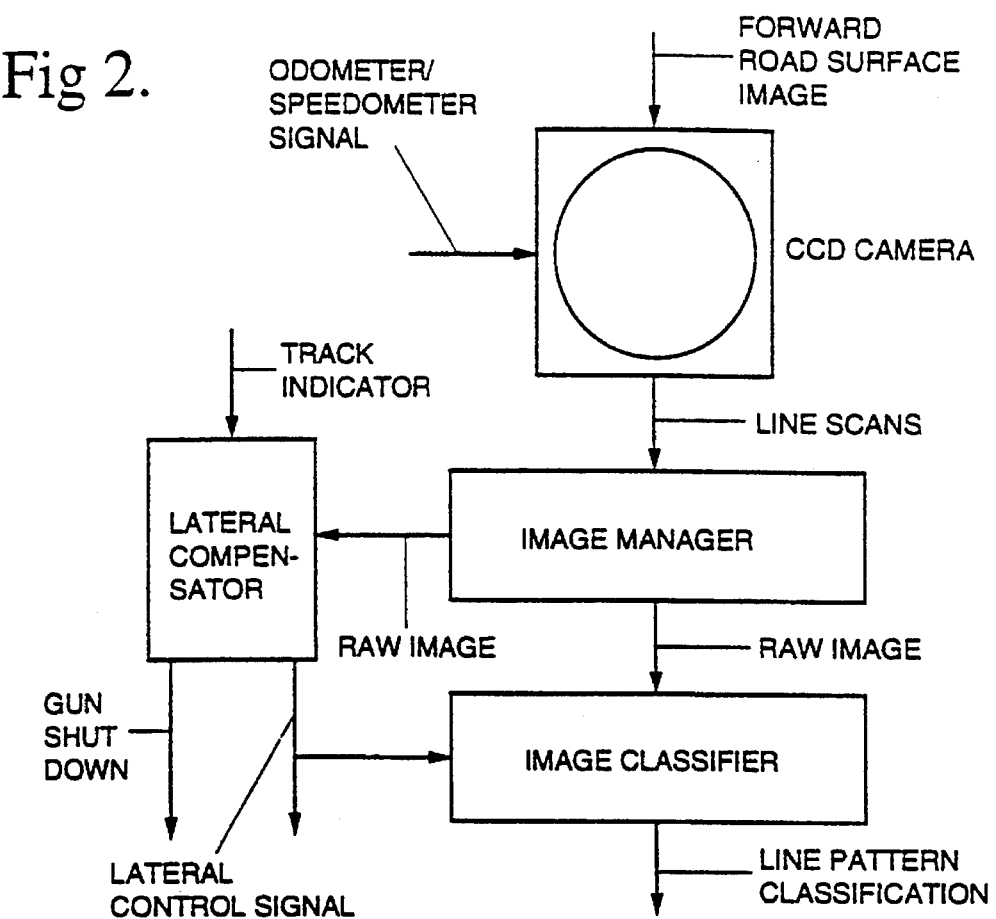
FIG. 2 represents schematically operation of a survey system line detection apparatus forming part of the system illustrated in FIG. 1.
Figure 3:
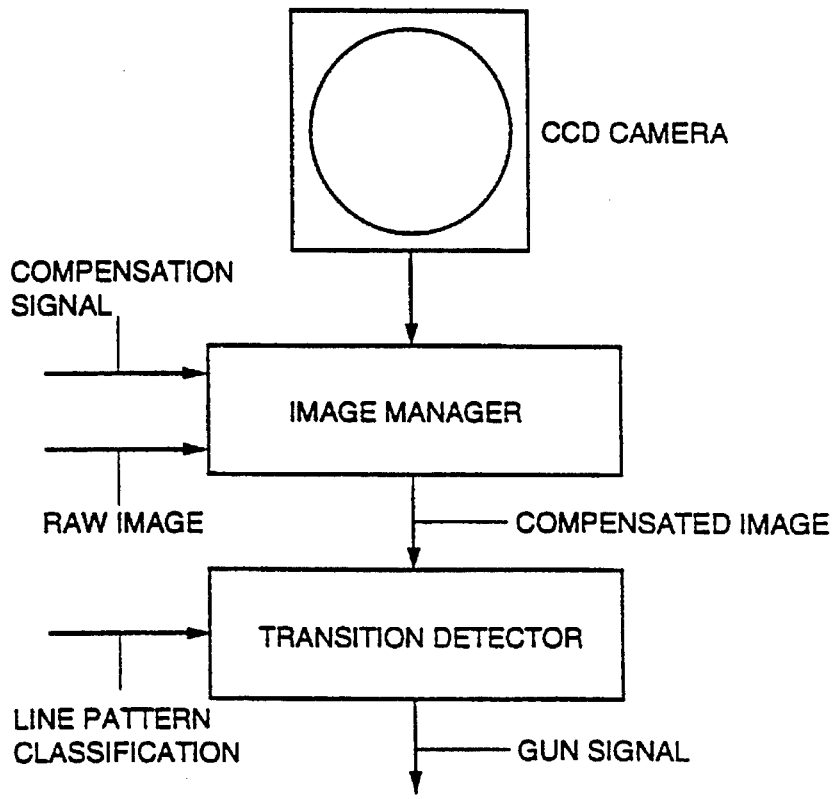
FIG. 3 represents schematically operation of a control system line detection apparatus forming a further part of the system illustrated in FIG. 1.

Apparatus according to the present invention may be mounted on or from a suitable vehicle such as a truck or the like capable of carrying quantities of line marking materials to refurbish lines on a desired length of roadway or pavement surface. The form of mounting may include a forwardly mounted and extending boom such as in U.S. Pat. No. 5,054,959, but other carrying arrangements might also be used. The control apparatus conveniently includes a forwardly located survey system, a mid located control system (relative to vehicle travel/old line pattern direction), both of which are used to control a rearwardly located mechanical system for positioning and controlling application of the line marking material. Preferably, visual left and right trajectory guides are provided capable of being viewed by the driver of the vehicle so that the driver may conveniently locate the vehicle during high speed operation so that the old line pattern on the pavement surface passes within a predetermined operational width defined by the survey system.

The survey system includes a forwardly (in use) mounted CCD camera which is generally sensitive to the overall pattern of the old line markings in the pavement surface. The CCD camera of the survey system is driven from the carrying vehicles transmission (or is otherwise responsive to speed of operation of the carrying vehicle), and acquires a transverse line scan repeatedly over short discrete lengths of road surface, for example, every five mm. The optics and mounting geometry of the CCD camera of the survey system map repeated transverse line scans to approximately half a meter of road surface width. The survey system further includes an image manager that buffers and aggregates the CCD camera pixels into an array, 13 across (transverse) by 5 in the direction of vehicle travel. Each of these pixels may be about 40 mm wide (giving a transverse scan of 520 mm total) and about 1 meter long (giving a longitudinal scan of about 5 meters total).

The survey system also includes a lateral compensator which compresses a copy of the aforesaid pixel array into an array of 13 across and one (1) longitudinally. This is achieved by averaging along each column of the five by one meter pixels. The lateral compensator has conveniently been taught, through a neural network, to recognise lateral drift of the road surface image and to compensate for such lateral drift. The signal from the lateral compensator is applied both to the mechanical system and to the image classifier of the survey system to rotate left/right so that they are laterally central to their respective pixel frames. The image classifier has been taught (through a neural network) to classify transitions from one paint pattern to the next in an old pattern on the roadway surface. Transitions are defined by a state-transition diagram. Any transition detected by the survey system is signalled ahead to the control system so that it knows what kind of transition to look for.

As indicated above, the lateral compensation signal is also passed to the mechanical system which moves the line marking material applicator means left or right to position the line marking material applicator means correctly over the old line (or lines).

At any time, the current track is indicated by a setting manually input by the driver (or operator). This determines which line material applicator (paint supply gun in the case of liquid paint being applied) is in operation for a single paint line (either continuous or intermittent). If a wrong track is detected by the survey system, it issues an override signal which switches off the applicators temporarily and connects the tracking by repositioning the carriage carrying the applicators (see for example U.S. Pat. No. 5,054,959). Furthermore, the lateral compensator can recognise paint images at the extremities of the CCD camera field of view. It will then issue an emergency shut down signal to the applicators (paint guns).

Figure 4:
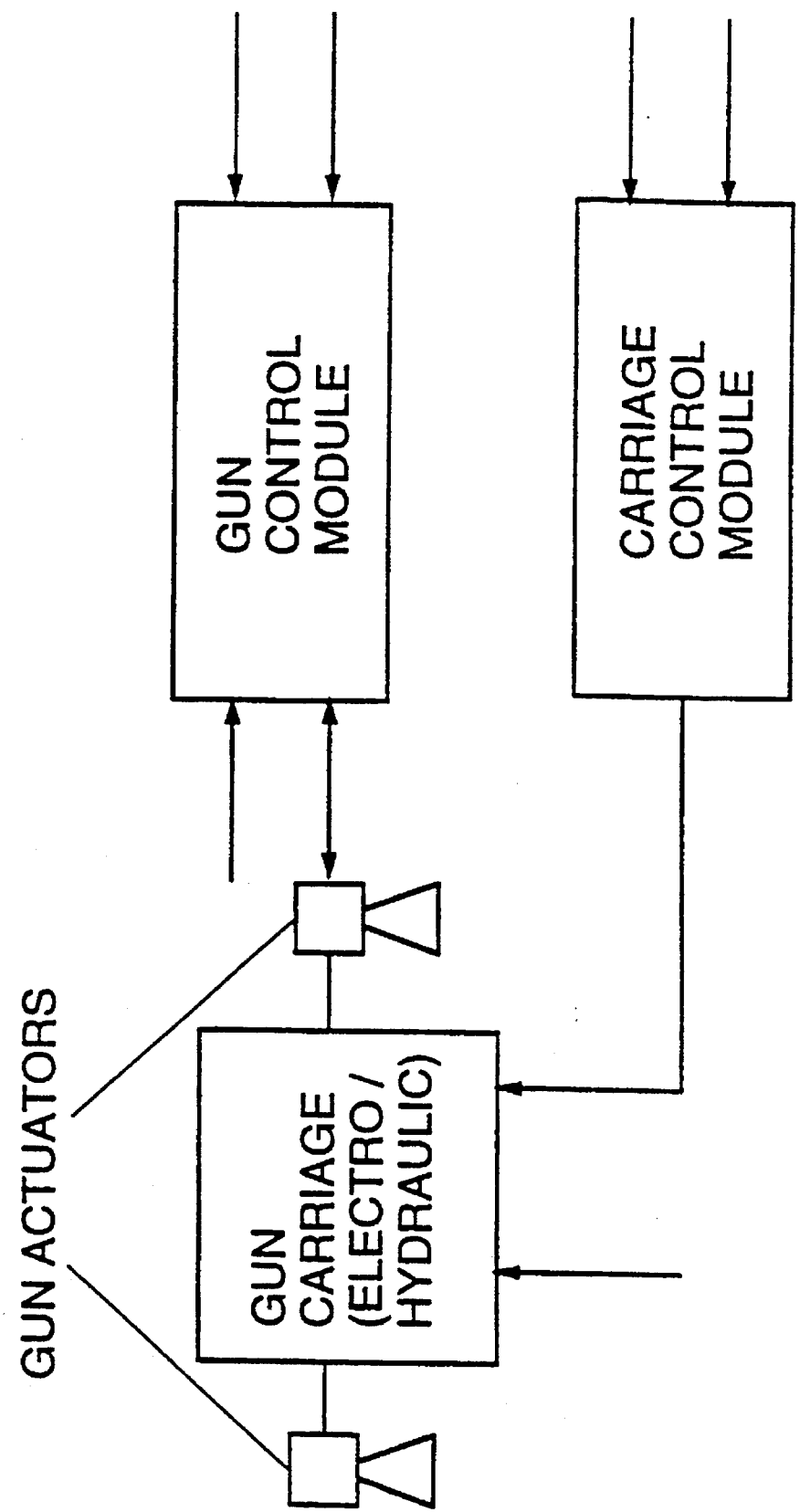
FIG. 4 represents schematically operation of a mechanical system controlled by the control system for correctly actuating the line marking material applicators.

Referring now to FIG. 4, the control system comprises a CCD camera, driven from the vehicle transmission (or some other vehicle speed controlled input) and acquires a transverse line scan approximately every 5 mm. The optics and mounting geometry map a transverse line scan to approximately half a meter of road width. The control system includes an image manager that buffers and aggregates the CCD pixels into an array 13 across by 10 along the direction of travel. Each pixel in the array may be approximately 40 mm wide giving a total width in the array of 520 mm and 30 mm long giving an approximate length of the array of 300 ram. The incoming lateral compensation signal causes images in the Transition Detector to rotate left/right so that they are laterally central to their pixel frame.

The Transition Detector has been taught (through a Neural Network) to recognise the exact point at which a transition occurs between one line pattern and the next. The Transition Detector uses not only the buffered image from the CCD camera of the control system, but also the incoming pattern classification from the survey system, to determine what kind of signal to send to the line marking material applicators. The applicator signals may be:

"P" ≡ pulse ≡ on for 3 m and off for 8.5 m which is the normal line/spacing configuration for intermittent road lines in Australia "O"≡open "C"≡close FIG. 4 illustrates schematically the control system for the mechanical system which may be constructed as in U.S. Pat. No. 5,054,959. In the following discussion reference is made to paint guns, however, other forms of applicators could be used depending on the nature of the line marking material used. The paint gun actuators are signalled open/closed by the gun control module. It receives signals O, C or P from the control system. "P" (or pulse) results in a timed open-close sequence from the paint gun control module. The paint guns can be shut down (until manually reset by the driver/operator) with a gun shut down signal from the survey system. This is a fail-safe mechanism to avoid out of range paint application. When a track change over-ride signal is received from the survey system, the paint guns momentarily shut off to allow the gun carriage to take up its correct position. Lateral control signals cause the gun carriage to move left or fight for lateral compensation of the vehicles trajectory. Both the gun control module and the carriage control module have control loops to effect proper gun actuator movement and carriage position.

We claim:

1. In control apparatus for controlling application of line marking to refurbish an old line pattern on a pavement surface, said control apparatus including at least one line detection means adapted in use to transverse scan a predetermined width of said pavement surface substantially greater than a width of said old line pattern while being carded forwardly in the direction of said old line pattern, said line detection means including pattern transition detector means taught through a neural network to recognise line pattern changes and in response thereto, control line marking material applicator means to repeat accurately said line pattern changes.

2. In control apparatus according to claim 1, wherein first and second said line detection means is provided, said first line detection means adapted to be mounted in use at a forward position whereby a first predetermined width of said pavement surface substantially greater than said old pattern width is transverse scanned with information indicative of said old line pattern viewed by said first line detection means being retained over a first predetermined length of said pavement surface in the direction of said old line pattern, said second line detection means being mounted in use rearwardly of said first line detection means, said second line detection means being in use arranged to transverse scan a second predetermined width of said pavement surface substantially greater than the width of said old line pattern with information indicative of said old line pattern viewed by said second line detection means being retained over a second predetermined length of said pavement surface in the direction of said old line pattern, said first line detection means further recognising transition points in said old line pattern, said first line detection means further recognising transition points in said old line pattern and providing a signal indicative of said transition points to said second line detection means, said second line detection means including transition detector means which receives the signal indicative of transition points from said first line detection means and information from the transverse scan of said second line detection means and in response thereto provides control signal means to control on/off conditions of said line marking material applicator means.

3. Control apparatus for controlling application of line marking material to refurbish an old line pattern on a pavement surface, said control apparatus comprising a first line detection means adapted to be mounted in use at a forward position whereby a first predetermined width of said pavement surface substantially greater than said old pattern width is transverse scanned with information indicative of said old line pattern viewed by said first line detection means being retained over a first predetermined length of said pavement surface in the direction of said old line pattern, a second line detection means adapted to be mounted in use rearwardly of said first line detection means, said second line detection means being in use arranged to transverse scan a second predetermined width of said pavement surface substantially greater than the width of said old line pattern with information indicative of said old line pattern viewed by said second line detection means being retained over a second predetermined length of said pavement surface in the direction of said old line pattern, said first line detection means further recognising transition points in said old line pattern and providing a signal indicative of said transition points to said second line detection means, said second line detection means including transition detector means which receives the signal indicative of transition points from said first line detection means and information from the transverse scan of said second line detection means and in response thereto provides control signal means to control on/off conditions of said line marking material applicator means.

4. Control apparatus for controlling application of line marking material to refurbish an old line pattern on a pavement surface, said control apparatus comprising a first line detection means adapted to be mounted in use at a forward position whereby a first predetermined width of said pavement surface substantially greater than said old pattern width is transverse scanned with information indicative of said old line pattern viewed by said first line detection means being retained over a first predetermined length of said pavement surface in the direction of said old line pattern, a second line detection means adapted to be mounted in use rearwardly of said first line detection means, said second line detection means in use being arranged to transverse scan a second predetermined width of said pavement surface substantially greater than the width of said old line pattern with information indicative of said old line pattern viewed by said second line detection means being retained over a second predetermined length of said pavement surface in the direction of said old line pattern, said first line detection means producing a lateral shift control signal indicative of lateral shift of said old line pattern as sensed with said lateral shift control signal being adapted to control lateral movement of line marking material applicator means to correctly deposit said line marking material over lines forming said old line pattern, said first line detection means further recognising transition points in said old line pattern and providing a signal indicative of said transition points to said second line detection means, said second line detection means including transition detector means which receives the signal indicative of transition points from said first line detection means and information from the transverse scan of said second line detection means and in response thereto provides control signal means to control on/off conditions of said line marking material applicator means.

5. Control apparatus according to claim 3 or claim 4, wherein said first predetermined length of scanned pavement surface is substantially greater than said second predetermined length.

6. Control apparatus according to claim 5, wherein said first predetermined length is about five meters.

7. Control apparatus according to claim 5, wherein said first and said second predetermined widths are between 400 mm and 1200 mm.

* * * * *